L. S. CRITTENDEN.
COMBINED HORSE-BLANKET AND FLY-NET.
No. 170,528. Patented Nov. 30, 1875.
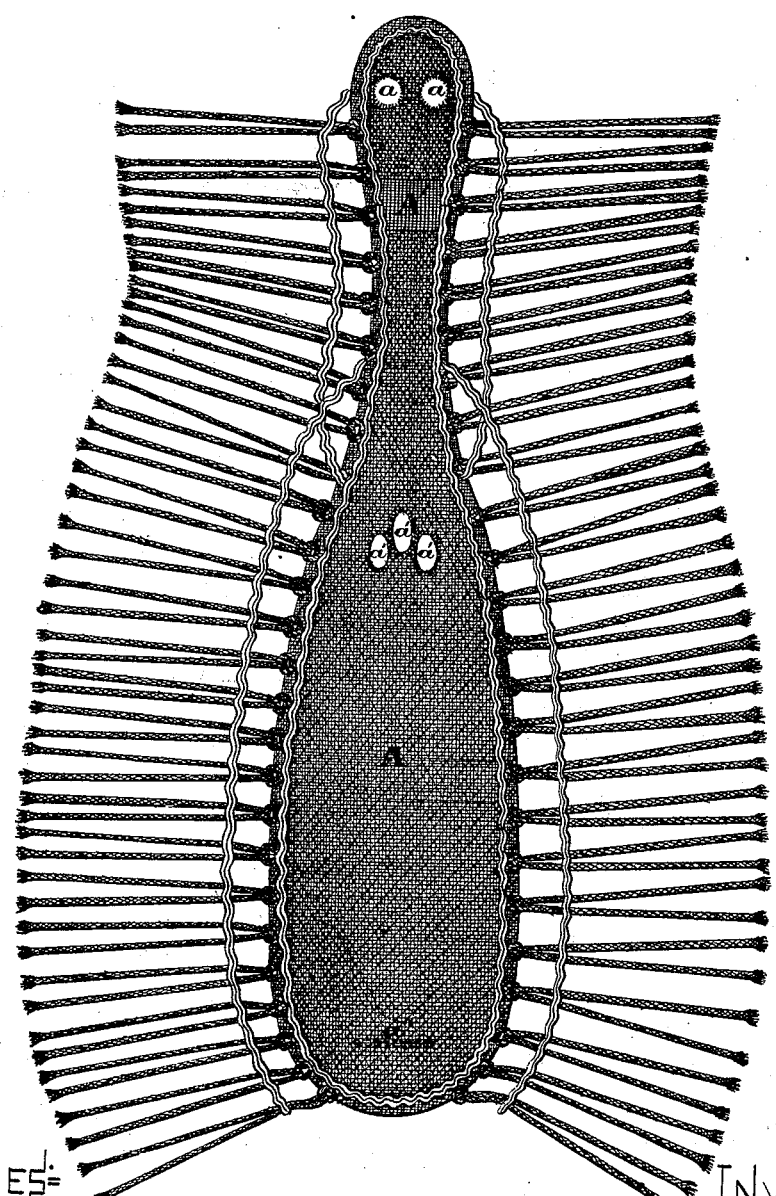

UNITED STATES PATENT OFFICE.

LOUIS S. CRITTENDEN, OF ANGELICA, NEW YORK.

IMPROVEMENT IN COMBINED HORSE-BLANKETS AND FLY-NETS.

Specification forming part of Letters Patent No. 170,528, dated November 30, 1875; application filed October 20, 1875.

*To all whom it may concern:*

Be it known that I, LOUIS S. CRITTENDEN, of Angelica, in the county of Allegany and in the State of New York, have invented certain new and useful Improvements in Combined Horse-Blanket and Fly-Net; and do hereby declare that the following is a full, clear, and exact description thereof, reference being had to the accompanying drawing making a part of this specification, in which is shown, in plan view, my improved device.

The design of my invention is to combine in one device the advantages of a horse-blanket and fly-net; and it consists in the peculiar construction of the combined blanket and fly-net, substantially as and for the purpose hereinafter specified.

In the annexed drawing, A represents a horse-blanket, fitted to the shape of the back of a horse, provided with suitable openings $a$ and $a$ for the ears of the horse, and other openings $a'$, $a'$, and $a'$ for the passage of the terrets and check-rein hook, and having near its rear end and upon its lower side a loop, $a''$, with which to fasten the same to the back-strap of the harness. At a point near the junction of the neck and body portions of the blanket is inserted a transverse strip or section of elastic web, A', which, when said blanket is in place by yielding, enables its wearer to move the head freely downward without derangement of any portion of said blanket. Around the edge of the blanket A are secured strips of leather, pieces of cord, or other suitable material, which depend from the same and serve to protect the sides of a horse from flies and other like insects.

The device thus constructed combines in a simple form all of the advantages of a net and blanket, fits easily upon a horse, does not interfere in the slightest degree with the freedom of its head, and does not require removal when the animal is being fed or watered. It also enables the horse to be driven either with or without the use of a check-rein without rendering necessary a change of adjustment.

Having thus fully set forth the nature and merits of my invention, what I claim as new is—

The blanket A, provided around its edges with a fringe, B, and constructed with a head and a body section, which are combined by means of the elastic webbing A', substantially as and for the purpose specified.

In testimony that I claim the foregoing I have hereunto set my hand this 24th day of September, 1875.

LOUIS S. CRITTENDEN.

Witnesses:
   S. S. NORRIS,
   M. S. BLAIR.